W. E. WILLIAMS.
VALVE MECHANISM FOR EXPLOSIVE ENGINES.
APPLICATION FILED JULY 1, 1913.

1,216,757.

Patented Feb. 20, 1917
4 SHEETS—SHEET 1

Witnesses:
Inventor.
William Erastus Williams

W. E. WILLIAMS.
VALVE MECHANISM FOR EXPLOSIVE ENGINES.
APPLICATION FILED JULY 1, 1915.
1,216,757.  Patented Feb. 20, 1917.
4 SHEETS—SHEET 2.
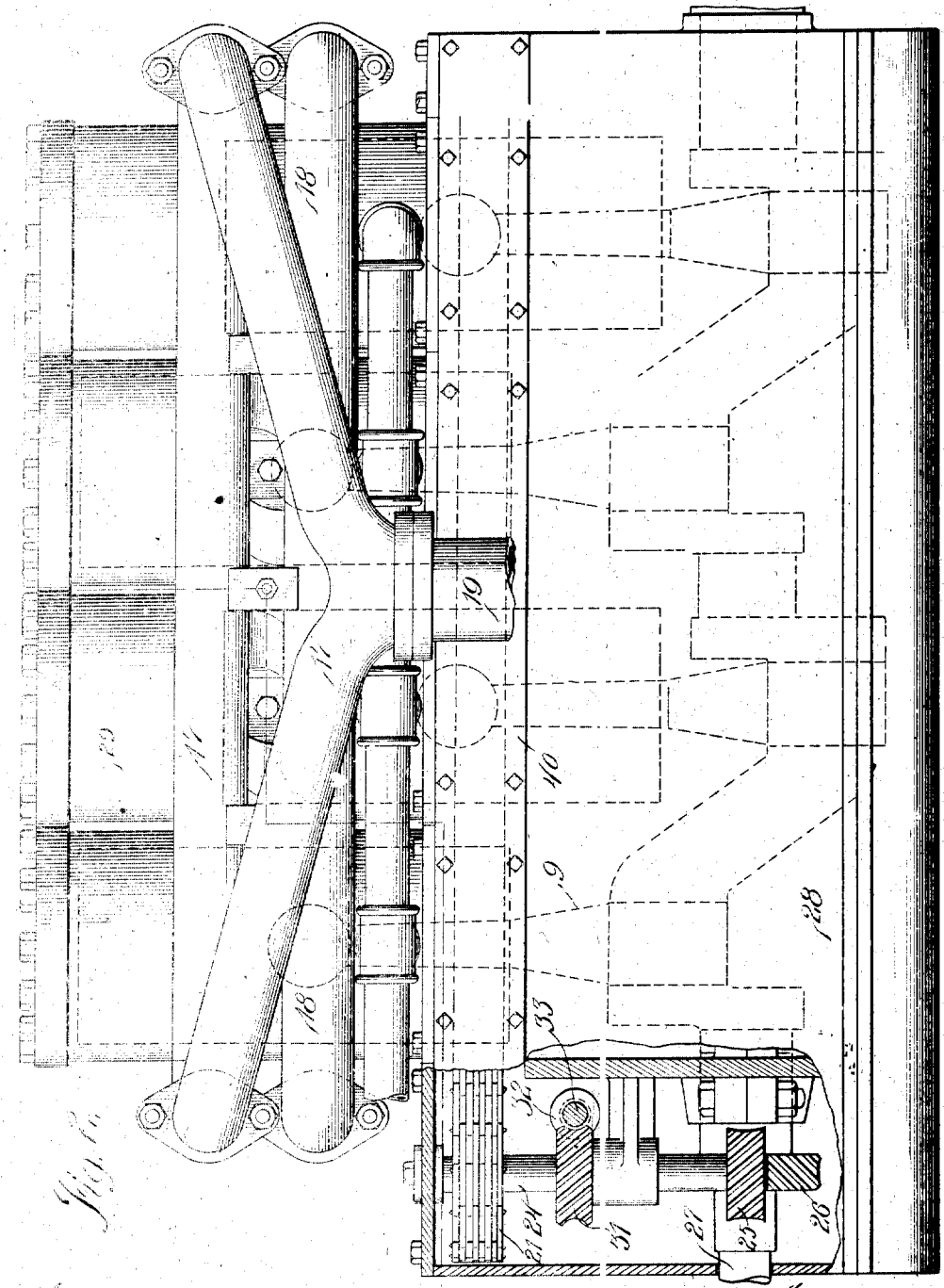

W. E. WILLIAMS.
VALVE MECHANISM FOR EXPLOSIVE ENGINES.
APPLICATION FILED JULY 1, 19 3.
1,216,757.
Patented Feb. 20, 1917
4 SHEETS—SHEET 3.
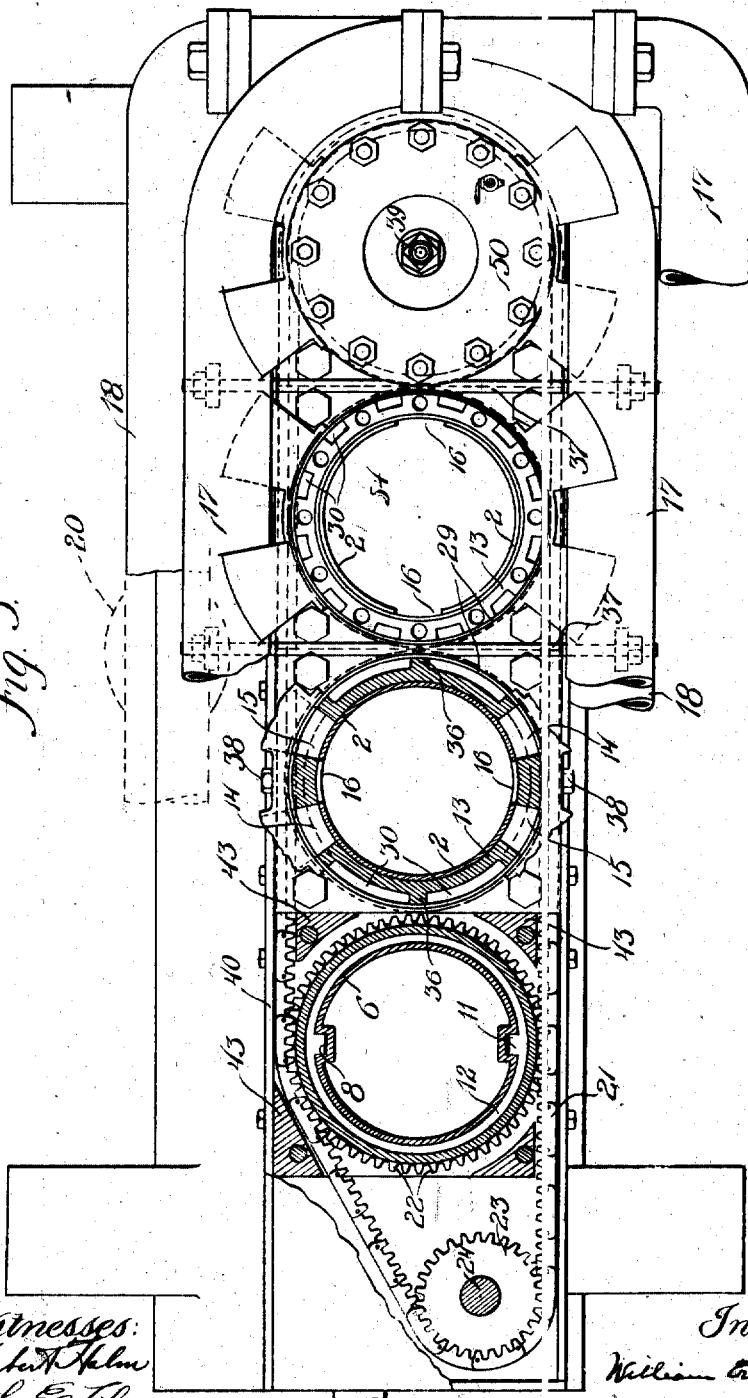
Witnesses:
Inventor, W. E. WILLIAMS.
VALVE MECHANISM FOR EXPLOSIVE ENGINES.
APPLICATION FILED JULY 1, 1913.
1,216,757.
Patented Feb. 20, 1917.
4 SHEETS—SHEET 4.
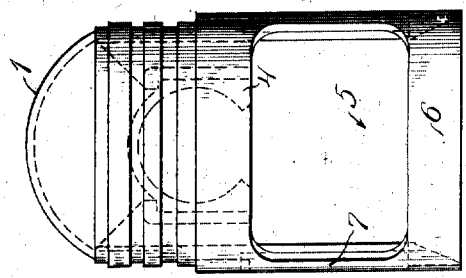
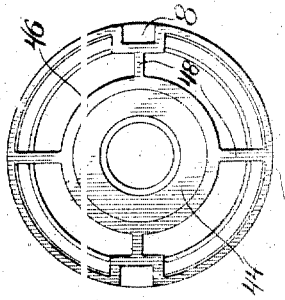
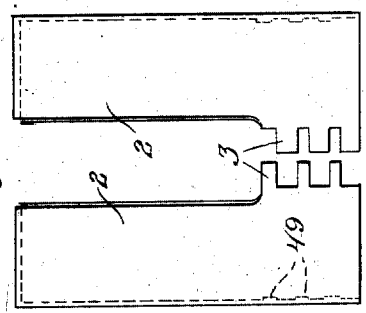
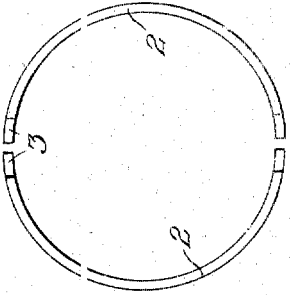
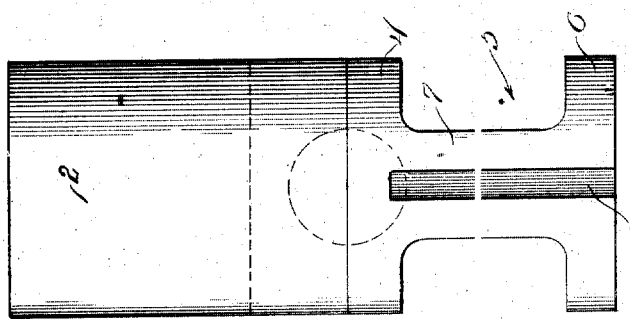
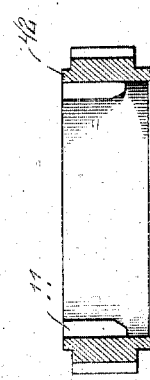

UNITED STATES PATENT OFFICE.

WILLIAM ERASTUS WILLIAMS, OF CHICAGO, ILLINOIS.

VALVE MECHANISM FOR EXPLOSIVE-ENGINES.

1,216,757.  Specification of Letters Patent.  Patented Feb. 20, 1917.

Application filed July 1, 1913. Serial No. 776,787.

*To all whom it may concern:*

Be it known that I, WILLIAM ERASTUS WILLIAMS, a citizen of the United States, residing at Chicago, in the county of Cook and State of Illinois, with a post-office address at 331 South Clinton street, have invented a new and useful Improvement in Valve Mechanism for Explosive-Engines, of which the following is a specification.

This invention relates to internal combustion or other engines, air compressors and the like, in which a reciprocating piston is rotated about its own axis thereby opening and closing the inlet and exhaust ports.

In the accompanying drawings,

Fig. 2 is a side elevation of the same engine, parts being broken away to show interior construction.

Fig. 3 is a section on the broken line 3—3, Fig. 2.

Fig. 4 shows the lower end face of the piston.

Fig. 5 is a side elevation of the piston.

Fig. 6 shows, detached and slightly separated, certain sleeve members normally forming an extension of the piston.

Fig. 7 shows the same pieces as seen from below.

Fig. 8 shows the assembled parts of the piston, the point of view being 90°, angularly, from the point of view selected for Fig. 5.

Figs. 9 and 10 are, respectively, a plan view and a diametrical section of a piston-rotating gear.

Figure 1:
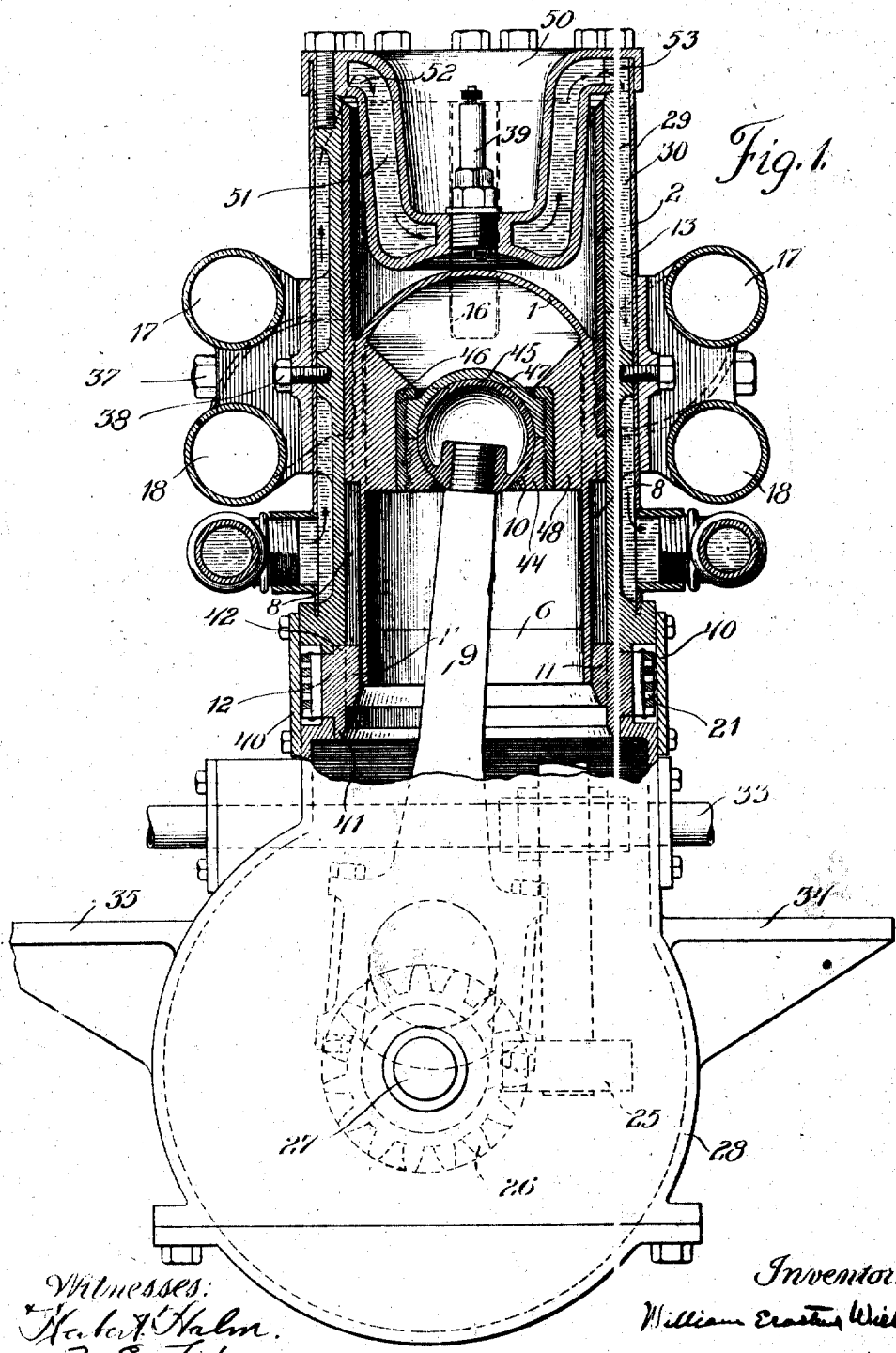
Figure 1 is an end elevation, partly in axial section through one cylinder, of a four cylinder gas engine embodying my invention.

The apparatus illustrated has four similar upright cylinders 13, Figs. 1 and 3, supported above the body of a base 28, which extends under all the cylinders, by means of lugs or blocks 43 which extend upward at intervals from the latter. In each cylinder works a rotary reciprocating piston 1 connected by a crank rod 9 to a crank shaft 27 mounted in the base 28 which forms the crank case.

Each piston has at its upper end a tubular extension 2 fitting closely in the cylinder and made in two parts, as best seen in Figs. 6, 7, each having at its lower end internal annular ribs 49, to engage grooves in the body of the piston, and also projections 3 which interlock when the parts are in place. Above the ribs, the halves or parts are marginally cut away, as shown in Fig. 6, forming a slot 16,—shown in dotted lines in Fig. 1,—which owing to the rotation of the piston opens and closes at proper times exhaust ports 14 and inlet ports 15.

The body of the piston is provided with a tubular skirt 4 which is cut away at 5, Figs. 5, 8, on opposite sides leaving a lower annular portion 6, Figs. 1, 4, 5, 8, connected to the upper portion by portions 7 which together with the annular portion are grooved or slotted at 8, and the two slots of each skirt are always engaged by projections 11 on a ring 12 having external gear teeth 22 that are constantly engaged by a "silent drive" chain 21. This chain incloses all the rings and engages the teeth of each and is itself driven from the crank shaft 27 by means of helical gears 25, 26, a vertical shaft 24 and a sprocket wheel 23. Convenient access to the chain is had by removing side cover plates 40, Figs. 1, 2. The chain and the rings lie in the horizontal plane of the cylinder supporting projections 43, some of which, as seen in Fig. 3, lie within the path of the chain and alongside the geared rings, while others lie outside that path. These blocks may be integral with the base or otherwise, but preferably those outside the path of the chain are removable so that the chain itself may be more readily removed when desired. The gears are provided with annular flanges 41 which rotate in bearings 28', Fig. 1, in the top of the base or crank case, while a similar flange 42 rotates in like manner in a bearing in the lower end of the cylinder, and hence the ring, notwithstanding stress of the chain, always registers exactly with the interior of the cylinder so that the piston moves freely in both cylinder and ring. It may be here noted that the blocks 43 prevent all vertical pressure upon the rings, and that the use of the latter while not indispensable is preferred to having the chain engage the skirt directly.

The hollow piston 1, shown in Fig. 1 as in the position of maximum compression, is dome-like above and provided with radial lateral ribs 48 in which is secured an internally threaded sleeve 46.

A hollow ball 45 is threaded upon the crank rod 9 and fits in a cup 47 screwed into the sleeve 46 and forming, at some distance below the dome, the upper half of a bearing the lower portion of which consists of a corresponding member 44, also screwed into the sleeve and cut away centrally to receive the piston rod and allow it to swing in action. This construction allows full access of oil to the interior of the piston, with cooling effect, and the oil passes through apertures, not shown, in the cup 47 and keeps the joint 10 perfectly lubricated.

The two parts of the sleeve 2 which engages the piston by means of the ribs 49, press against a large area of the cylinder walls and practically perform the office of the usual piston rings with negligible frictional loss. Each of the two slots 16 serves alternately as an inlet port and an exhaust port, and to obtain the equivalent of four cycle valve action, the piston makes one fourth of a revolution for each full rotation of the crank shaft, whence it follows that the loss of energy through rotating the piston is not important.

Each of the cylinders is encircled by a sheet metal jacket 29, forming a water space 30 which is divided on each side of the cylinder by a wall 36; whereby the water is caused to circulate, passing upward and through the water spaces 51 in the cylinder heads or caps 50, the water thus entering at 52 on one side and passing out at 53 on the opposite side at the same level.

The exhaust pipes 17 and intake pipes 18 are connected with the ports on opposite sides of the cylinders, and with an exhaust pipe 19 and a carbureter 20, respectively. They form a rigid frame about the cylinders (Figs. 1, 2, 3,) and are supported in rigid members or brackets secured to the cylinders by bolts 37, 38 which also serve to clamp the jackets firmly between the brackets and suitable bosses or projections on the cylinders and make securely tight joints at the ports. Usually, the pipes are made in segments which are bolted together, as seen at the right and left in Fig. 2 and at the right in Fig. 3. The use of sheet metal for the water jacket saves in weight, simplifies the casting, and tends to prevent rupture by freezing, the latter being a point of much importance.

A set of helical gears 31, 32 drives a cross shaft 33 for operating a pump, not shown, supported upon brackets 34, 35, Fig. 1, and also for operating a magneto device, and ignition is effected by a spark plug 39.

What I claim is:

1. The combination with an engine cylinder having suitable ports and a piston working in said cylinder, of a longitudinally divided sleeve embracing the piston and having its meeting margins which overlap the piston provided, respectively, with recesses and corresponding projections to fit in said recesses, for preventing leakage along the joint between the two margins.

2. The combination with a thin walled hollow piston having at intervals ribs projecting inwardly from said walls, of a socket bearing held by said ribs at some distance from all said walls, and a piston rod provided with a ball held in said bearing; whereby all the thin walls are in direct free communication with the space below the open end of the piston.

In witness whereof I have hereunto subscribed my name in the presence of two subscribing witnesses, in the city of Chicago, this 23 day of June, 1913.

WILLIAM ERASTUS WILLIAMS.

Witnesses:
N. M. HYBARGER,
M. BROWN.